R. H. Seymour.
Shears.

Nº 94,247.      Patented Aug. 31, 1869.

Witnesses.
Joseph Parker
Edward E. Osborn.

Inventor:
Robert H. Seymour.

United States Patent Office.

ROBERT H. SEYMOUR, OF NEW YORK, N. Y., ASSIGNOR TO HENRY SEYMOUR AND COMPANY, OF SAME PLACE.

Letters Patent No. 94,247, dated August 31, 1869.

IMPROVEMENT IN SHEARS.

The Schedule referred to in these Letters Patent and making part of the same.

*To all whom it may concern:*

Be it known that I, ROBERT H. SEYMOUR, of the city, county, and State of New York, have invented a new and useful Improvement in Tailors' Shears; and I do hereby declare the following to be a full, clear, and exact description of the construction and operation of the same, reference being had to the accompanying drawings, in which—

Figure 1:
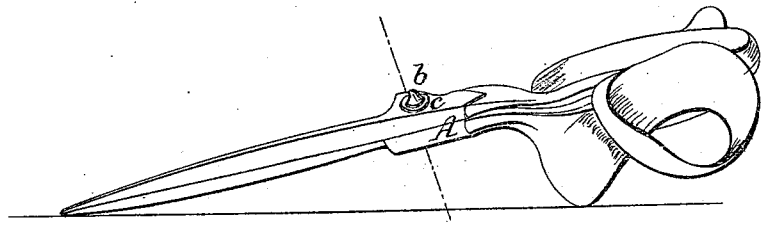
Figure 2:
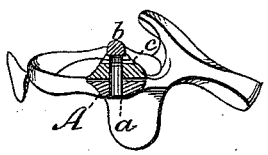
Figure 3:
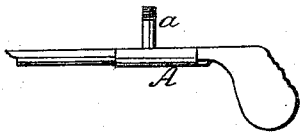

Figure 1 is a view of a pair of shears constructed in accordance with my invention, and Figure 2 is a sectional view of the same.

Similar letters of reference indicate like parts in the several drawings.

My invention relates to the manufacture of shears, scissors, and similar cutting-instruments, and consists in a novel construction of one of the jaws or blades to receive the other, so that I am enabled to dispense with the bolt-head on the side of one of the blades, thereby preventing the cloth from being deflected in cutting, by catching on the bolt-head.

To enable others skilled in the art to make and use my invention, I will describe the construction and operation of the same.

The lower blade A, in the course of manufacture, is formed with a pivot, $a$, cast with it, or secured to it in proper position by welding, to serve as a bearing for the upper blade.

It is made of such length as to permit its end, upon which a screw-thread is cut, to project above the surface of the upper blade B, a sufficient distance to allow the cap $b$, and washer or check-nut $c$, to be screwed down upon it for the purpose of holding the two blades together.

By this mode of construction, the employment of the detached pivot with a projecting head, now in use, is in a great measure dispensed with, and a smooth surface is formed on the inner side of the shears.

No skill is necessary in setting or adjusting the cutting-edges of the shears thus constructed, and their liability to spring in cutting thick goods is entirely prevented.

Having thus fully described my invention,

I claim the shears consisting of the blade A, with pintle $a$, cast with or forming part thereof, and the blade B, all constructed as herein described.

ROBERT H. SEYMOUR.

Witnesses:
 JOSEPH PARKER,
 EDWARD E. OSBORN.